US011005926B2

(12) United States Patent
Kann et al.

(10) Patent No.: US 11,005,926 B2
(45) Date of Patent: May 11, 2021

(54) PRIVACY PROTECTION FOR PROXY AUTO-CONFIGURATION FILES

(71) Applicant: CITRIX SYSTEMS, INC., Burlington, MA (US)

(72) Inventors: Jong Kann, Santa Clara, CA (US); Kenneth Bell, Sunnyvale, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/522,244

(22) Filed: Jul. 25, 2019

(65) Prior Publication Data
US 2021/0029197 A1 Jan. 28, 2021

(51) Int. Cl.
*H04L 29/08* (2006.01)
*H04L 29/06* (2006.01)

(52) U.S. Cl.
CPC ...... *H04L 67/1023* (2013.01); *H04L 63/0281* (2013.01); *H04L 67/02* (2013.01); *H04L 67/1065* (2013.01)

(58) Field of Classification Search
None
See application file for complete search history.

(56) References Cited

U.S. PATENT DOCUMENTS

| | | | | |
|---|---|---|---|---|
| 2004/0006615 A1* | 1/2004 | Jackson | ............. | H04L 41/5009 709/223 |
| 2019/0386961 A1* | 12/2019 | Kupisiewicz | ....... | H04L 61/1511 |
| 2020/0186501 A1* | 6/2020 | Neystadt | ............ | H04L 63/0236 |

OTHER PUBLICATIONS

Findproxyforurl, Code Snippets, No Date, Retrieved on Dec. 14, 2020, from: http://findproxyforurl.com/pac-code-snippets-examples/ 3 pages.

* cited by examiner

*Primary Examiner* — Jeffrey R Swearingen
(74) *Attorney, Agent, or Firm* — Mintz Levin Cohn Ferris Glovsky and Popeo, P.C.

(57) ABSTRACT

A method may include generating a proxy auto-configuration file including a function and a hash value associated with a resource. The hash value may be determined based on an identifier of the resource. The proxy auto-configuration file may include the hash value instead of a plaintext value of the identifier to obscure the plaintext value of the identifier. The proxy auto-configuration file including the function and the hash value may be sent to at least enable the function to be invoked by a web browser at one or more clients. The function may be configured to respond to being invoked by the web browser by determining, based on the hash value, whether to bypass a proxy server when accessing the resource. Related systems and computer program products are also provided.

20 Claims, 9 Drawing Sheets

PRIVACY PROTECTION FOR PROXY AUTO-CONFIGURATION FILES

TECHNICAL FIELD

The subject matter described herein relates generally to network traffic controls and more specifically to privacy protection for proxy auto-configuration files.

BACKGROUND

A proxy server may control access to and from a network. For example, the proxy server may serve as an intermediary for requests from clients inside the network to access resources at servers outside of the network. The proxy server may perform a variety of tasks including, for example, inspecting content flowing through the proxy server, filtering the content, caching the content to expedite subsequent requests for the same content, anonymizing the requests to access the content, correcting errors in the content, and translating the content into a different language.

SUMMARY

Systems, methods, and articles of manufacture, including computer program products, are provided for protecting the privacy of a proxy auto-configuration file. In some example embodiments, there is provided a system that includes at least one processor and at least one memory. The at least one memory may store instructions. When executed by the at least one data processor, the instructions may cause the at least one data processor to at least: generate a proxy auto-configuration file including a function and a first hash value associated with a resource, the first hash value determined based at least on an identifier of the resource, and the proxy auto-configuration file including the first hash value instead of a plaintext value of the identifier to at least obscure the plaintext value of the identifier; and send the proxy auto-configuration file including the function and the first hash value to at least enable the function to be invoked by a web browser at one or more clients, the function configured to respond to being invoked by the web browser by at least determining, based at least on the first hash value, whether to bypass a proxy server when accessing the resource.

In some variations, one or more features disclosed herein including the following features can optionally be included in any feasible combination. In response to being invoked by the web browser, the function may be configured to determine a second hash value based on a plaintext input received from the web browser. The plaintext input may identify a resource being accessed by the web browser. The function may be further configured to output, based at least on the second hash value matching the first hash value, a first indication to access the resource through the proxy server or a second indication to bypass the proxy server when accessing the resource. The first indication may include an Internet Protocol address and a port number of the proxy server through which to access the resource.

In some variations, the identifier may include a uniform resource locator and/or a host identifier of the resource. The first hash value may be determined based on a pattern present in the uniform resource locator of the resource. The pattern may include a wildcard value for a portion of the uniform resource locator. The pattern may include the wildcard value instead of an actual value of the portion of the uniform resource locator. The portion of the uniform resource locator may include a prefix, a subdomain, a domain name, a suffix, or a port.

In some variations, the proxy auto-configuration file is published to a server for retrieval by the web browser, or generated and sent to the web browser in response to the web browser retrieving the proxy auto-configuration file.

In some variations, the first hash value may be determined based on a concatenation of the identifier and a salt.

In another aspect, there is provided a method for protecting the privacy of a proxy auto-configuration file. The method may include: generating a proxy auto-configuration file including a function and a first hash value associated with a resource, the first hash value determined based at least on an identifier of the resource, and the proxy auto-configuration file including the first hash value instead of a plaintext value of the identifier to at least obscure the plaintext value of the identifier; and sending the proxy auto-configuration file including the function and the first hash value to at least enable the function to be invoked by a web browser at one or more clients, the function configured to respond to being invoked by the web browser by at least determining, based at least on the first hash value, whether to bypass a proxy server when accessing the resource.

In some variations, one or more features disclosed herein including the following features can optionally be included in any feasible combination. In response to being invoked by the web browser, the function may be configured to determine a second hash value based on a plaintext input received from the web browser. The plaintext input may identify a resource being accessed by the web browser. The function may be further configured to output, based at least on the second hash value matching the first hash value, a first indication to access the resource through the proxy server or a second indication to bypass the proxy server when accessing the resource. The first indication may include an Internet Protocol address and a port number of the proxy server through which to access the resource.

In some variations, the identifier may include a uniform resource locator and/or a host identifier of the resource. The first hash value may be determined based on a pattern present in the uniform resource locator of the resource. The pattern may include a wildcard value for a portion of the uniform resource locator. The pattern may include the wildcard value instead of an actual value of the portion of the uniform resource locator. The portion of the uniform resource locator may include a prefix, a subdomain, a domain name, a suffix, or a port.

In some variations, the first hash value may be determined based on a concatenation of the identifier and a salt.

In another aspect, there is provided a computer program product that includes a non-transitory computer readable storage medium. The non-transitory computer-readable storage medium may store instructions. When executed by at least one data processor, the instructions may cause the at least one data processor to at least: generate a proxy auto-configuration file including a function and a first hash value associated with a resource, the first hash value determined based at least on an identifier of the resource, and the proxy auto-configuration file including the first hash value instead of a plaintext value of the identifier to at least obscure the plaintext value of the identifier; and send the proxy auto-configuration file including the function and the first hash value to at least enable the function to be invoked by a web browser at one or more clients, the function configured to respond to being invoked by the web browser by at least determining, based at least on the first hash value, whether to bypass a proxy server when accessing the resource.

Implementations of the current subject matter can include, but are not limited to, methods consistent with the descriptions provided herein as well as articles that comprise a tangibly embodied machine-readable medium operable to cause one or more machines (e.g., computers and/or the like) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems and/or the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
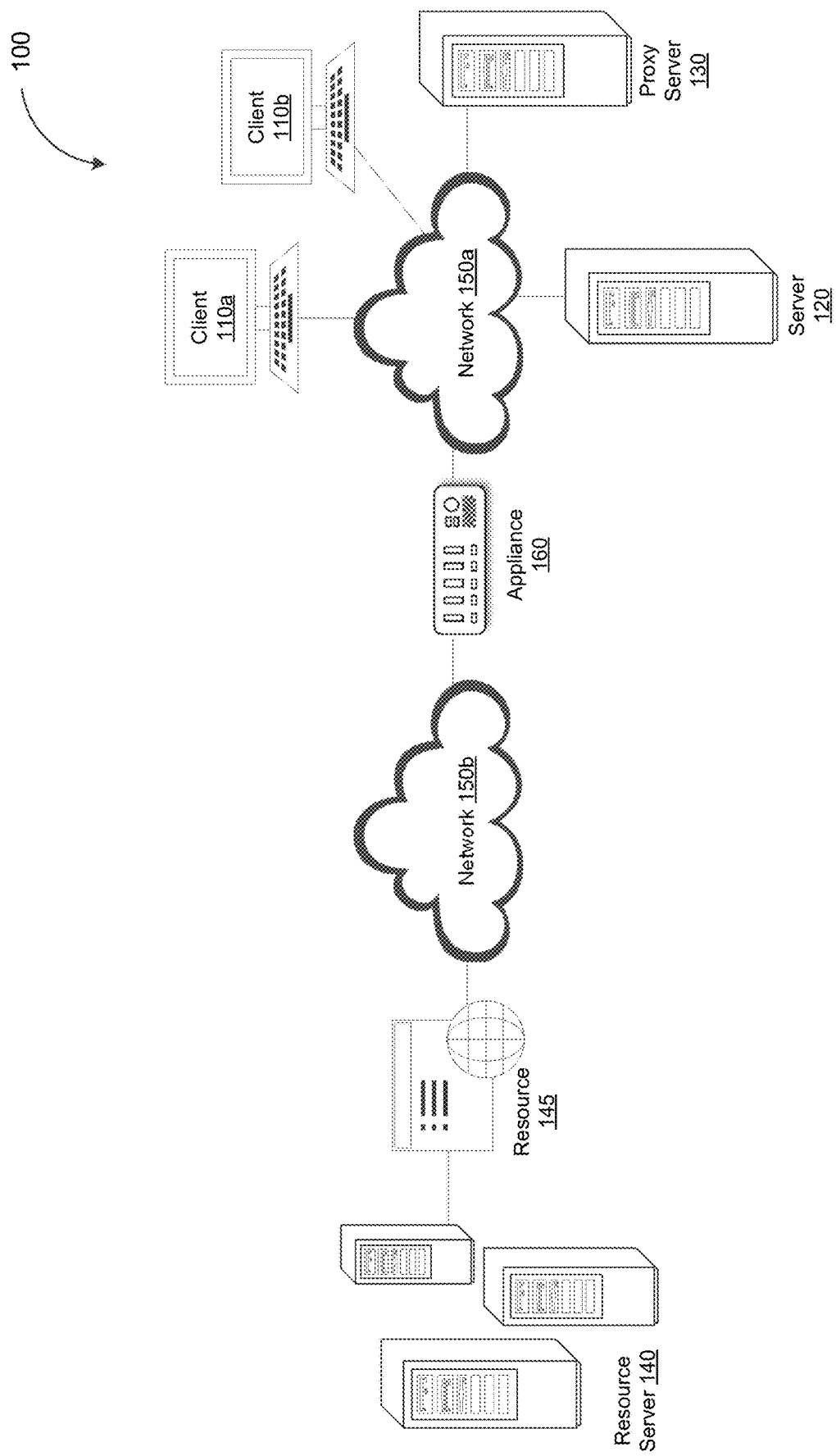
FIG. 1 depicts a system diagram illustrating an example of a proxy system, in accordance with some example embodiments.

An enterprise (e.g., a corporation, a government agency, and/or the like) may impose one or more rules controlling whether a web browser routes a request to access a resource outside of the enterprise's network directly or through a proxy server. If the request is routed through the proxy server, the request and/or the resource fetched by the request may be subject to traffic controls imposed by the proxy server. For example, the proxy server may inspect, filter, cache, anonymize, error correct, and/or translate the request and/or the resource fetched by the request. By contrast, if the request is routed directly to the resource, the request and the resource fetched by the request may bypass the proxy server and therefore avoid the traffic controls imposed by the proxy server. The one or more rules may be implemented by generating a corresponding proxy auto-configuration file. As used herein, a proxy auto-configuration file may refer to a file that defines how the web browser routes the request. For instance, the proxy auto-configuration file may include a set of instructions (e.g., coded in JavaScript and/or another programming language) corresponding to the rules controlling whether the web browser routes the request to access a resource outside of the enterprise's network directly or through a proxy server. Accordingly, the web browser may execute the proxy auto-configuration in order to determine the request is routed directly to the resource outside of the enterprise's network or through a proxy server.

The proxy auto-configuration file may be published such that the web browser may retrieve the proxy auto-configuration file prior to accessing the resource. Alternatively, the proxy auto-configuration file may also be generated and sent to the web browser on demand, for example, in response to the web browser retrieving the proxy auto-configuration file. Moreover, the proxy auto-configuration file may include a function whose output instructs the web browser to access the resource directly or through the proxy server. For example, the proxy auto-configuration file may include plaintext values identifying the resources that may be accessed through a proxy server and/or plaintext values identifying the resources that may be accessed directly while bypassing the proxy server. However, including these plaintext values in the proxy auto-configuration file may allow an unauthorized third party inspecting the proxy auto-configuration file to determine the enterprise's rules including the identities of the resources that may be accessed directly and/or the identities of the resources that may be accessed through a proxy server. Exposing the enterprise's rules to unauthorized third parties may compromise the enterprise's privacy as well as network security by allowing unauthorized third parties to determine the resources being accessed by the enterprise.

In some example embodiments, to avoid exposing the enterprise's rules, the proxy auto-configuration file may be generated to include hash values and not plaintext values to identify the resources associated with the rules. For example, the proxy auto-configuration file may include hash values to identify the resources that may be accessed through a proxy server and/or the resources that may be accessed directly without the proxy server. The proxy auto-configuration file may include a function configured to receive, from the web browser, an input including a plaintext value identifying a resource being accessed by the web browser. In response, the function may determine a hash value corresponding to the plaintext value received from the web browser. The function may map the hash value to a rule by at least determining the rule that is applicable to the resource corresponding to the hash value. Accordingly, the function may generate, based on the rule mapped to the hash value, an output indicating whether the resource may be accessed directly or through a proxy server. For instance, if the hash value is mapped to a rule that routes requests for the resource through a proxy server, the function may output a uniform resource locator (URL) of the proxy server through which to access the resource, such as a file, a connection, or a webpage. Alternatively, if the hash value is mapped to a rule allowing the resource to be accessed directly, the output from the function may instruct the web browser to bypass the proxy server and access the resource directly. It should be appreciated that the hash value may obscure the identity of the resource such that an unauthorized third party inspecting the proxy auto-configuration file is unable to determine that the resource is being accessed by the enterprise. The inclusion of hash values in the proxy auto-configuration file may therefore protect the enterprise's privacy and network security.

FIG. 1 depicts a system diagram illustrating an example of a proxy system 100, in accordance with some example embodiments. Referring to FIG. 1, the proxy system 100 may include a first client 110a, a second client 110b, a server 120, a proxy server 130, and a resource server 140. The first client 110a, the second client 110b, the server 120, the proxy server 130, and the resource server 140 may be communicatively coupled via a first network 150a and/or a second network 150. The first client 110a and the second client 110b may be any processor-based device including, for example, a smartphone, a tablet computer, a wearable apparatus, a virtual assistant, an Internet-of-Things (IoT) appliance, and/or the like. Meanwhile, the first network 150a and/or the second network 150b may be any wired and/or wireless network including, for example, a local area network (LAN), a virtual local area network (VLAN), a wide area network (WAN), a public land mobile network (PLMN), the Internet, and/or the like.

An enterprise may refer to a public or private entity including, for example, a corporation, a firm, an organization, an agency, a partnership, a cooperative, a syndicate, a group, a department, and/or the like. The enterprise may impose one or more rules controlling whether requests to access resources outside of the enterprise's network is routed directly or through a proxy server. In the example shown in FIG. 1, the enterprise may impose one or more rules controlling whether requests to access a resource 145 at the resource server 140, which may be outside of the first network 150a of the enterprise, are routed directly to the resource server 140 or through the proxy server 130. Although FIG. 1 shows the proxy server 130 as being inside the first network 150a of the enterprise, it should be appreciated that the proxy server 130 may also be part of the external second network 150b. Communication between the first network 150a of the enterprise and the external second network 150b may be conducted via one or more appliances such as, for example, the appliance 160 shown in FIG. 1. The appliance 160 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. The appliance 160 may be deployed as part of the first network 150a and/or the second network 150b.

Referring again to FIG. 1, applying the one or more rules, may cause a request from the first client 110a to access the resource 145 at the resource server 140 to be routed through the proxy server 130. Examples of the resource 145 may include a file, a connection, a webpage, and/or the like. Accordingly, the proxy server 130 may serve as an intermediary between the first client 110a and the resource server 140. As the intermediary, the proxy server 130 may perform a variety of tasks including, for example, inspecting content flowing through the proxy server 130, filtering the content, caching the content to expedite subsequent requests for the same content, anonymizing the requests to access the content, repairing errors in the content, translating the content into a different language, and/or the like. Alternatively, the one or more rules may allow the first client 110a to access the resource 145 at the resource server 140 directly, in which case the first client 110a may bypass the proxy server 130 when accessing the resource 145 at the resource server 140. It should be appreciated that when the first client 110a bypasses the proxy server 130, the request from the first client 110a as well as the resource 145 may be routed directly between the first client 110 and the resource server 140 without the proxy server 130 serving as an intermediary.

The one or more rules may be implemented by generating a corresponding proxy auto-configuration file. For example, a network administrator associated with the enterprise may generate, at the second client 110b, the proxy auto-configuration file and publish the proxy auto-configuration file to the server 120. As such, the first client 110 may retrieve the proxy auto-configuration file from the server 120 prior to accessing a resource outside of the enterprise's network such as the resource 145 at the resource server 140. Alternatively, the server 120 may generate and send the proxy auto-configuration file 200 on demand, for example, in response to the first client 110a requesting the proxy auto-configuration file 200.

Figure 2:
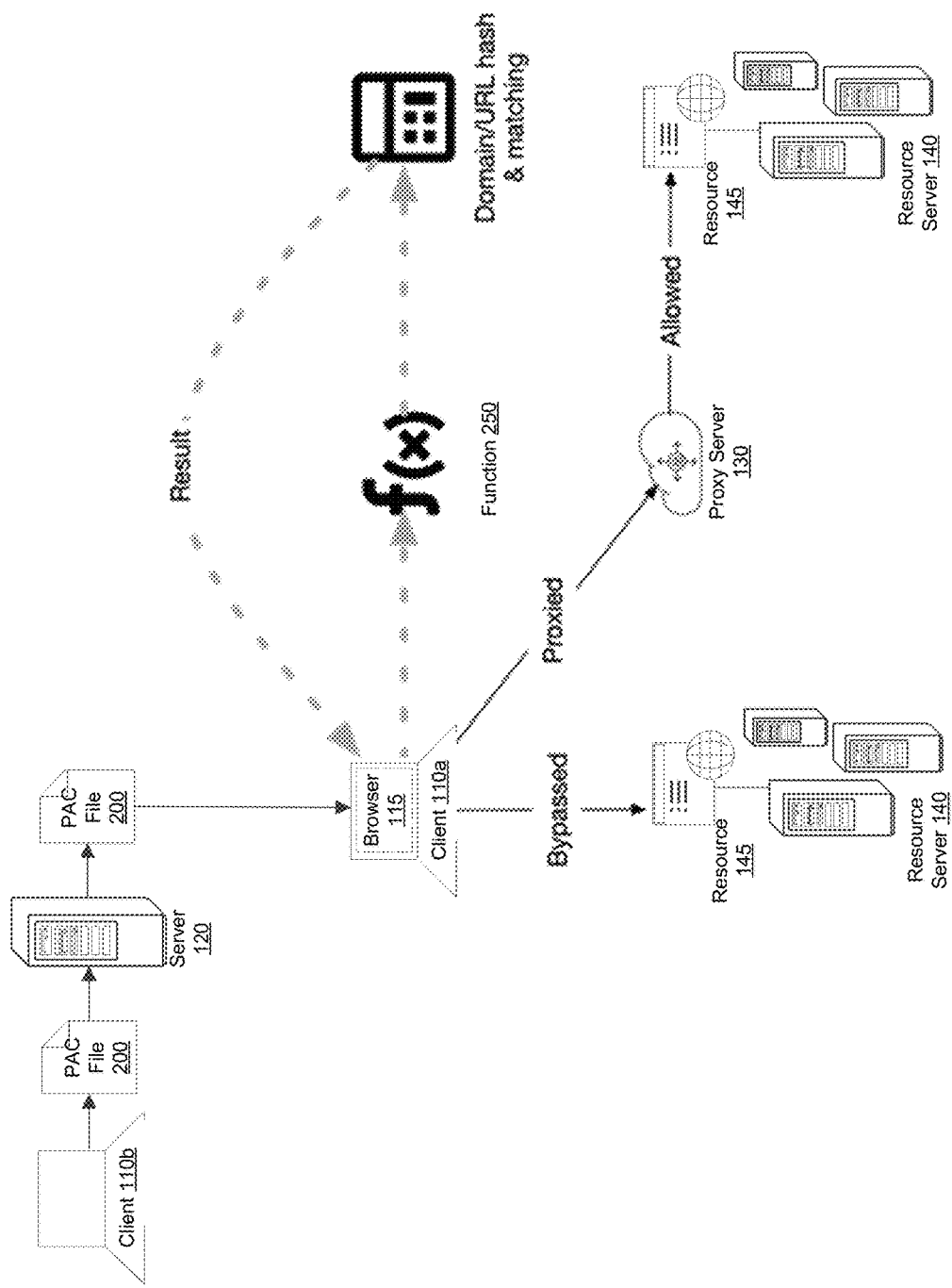
FIG. 2 depicts a dataflow diagram illustrating a proxy auto-configuration file used to implement a rule for accessing a resource at a resource server, in accordance with some example embodiments.

To further illustrate, FIG. 2 depicts a dataflow diagram illustrating a proxy auto-configuration file 200 being used to implement a rule for accessing the resource 145 at the resource server 140, in accordance with some example embodiments. Referring to FIGS. 1-2, prior to accessing the resource 145 at the resource server 140, a web browser 115 at the first client 110a may retrieve the proxy auto-configuration file 200 based at least on a uniform resource locator (URL) for retrieving the proxy auto-configuration file 200. This uniform resource locator may be configured at the web browser 115 manually. Alternatively, the web browser 115 may automatically determine the uniform resource locator for retrieving the proxy auto-configuration file 200 by at least executing, for example, a web proxy auto-discovery (WPAD) protocol and/or the like.

As noted, the second client 110b may publish the proxy auto-configuration file 200 to the server 120. Accordingly, the web browser 115 may retrieve, based at least on the uniform resource locator (URL) of the server 120, the proxy auto-configuration file 200 from the server 120. Alternatively, the server 120 may be configured to generate the proxy auto-configuration file 200 on demand, for example, in response to the web browser 115 accessing the server 120 to retrieve the proxy auto-configuration file 200. The web browser 115 may access the server 120 based on the uniform resource locator of the server 120. Moreover, the web browser 115 accessing the server 120 to retrieve the proxy auto-configuration file 200 may trigger, at the server 120, the generation of the proxy auto-configuration file 200. Upon generating the proxy auto-configuration file 200, the server 120 may send, to the web browser 115, the proxy auto-configuration file 200.

In some example embodiments, the proxy auto-configuration file 200 may include rules for a specific or desired resource. In such instances, the rule applicable to the resource 145 may be identified based at least on the identifier associated with the resource 145, which may include, for example, a uniform resource locator (URL) of the resource 145. Alternatively and/or additionally, the proxy auto-configuration file 200 may include pattern-based rules. A pattern-based rule may be applicable to the resource 145 may be identified based at least on a pattern present in the identifier associated with the resource 145. For instance, the pattern-based rule may be a prefix-based rule and/or a suffix-based rule that is identified as being applicable to the resource 145 based at least on a prefix and/or a suffix present in the uniform resource locator of the resource 145.

As used herein, the "prefix" may refer to a first quantity of characters at a beginning of a string corresponding to the uniform resource locator (URL) of the resource 145. The prefix included in the uniform resource locator of the resource 145 may specify the protocol used for accessing the resource 145 including, for example, hypertext transfer protocol (HTTP), hypertext transfer protocol secure (HTTPS), and/or the like. Meanwhile, the "suffix" may refer to a second quantity of characters at an end of the string corresponding to the uniform resource locator of the resource 145. The suffix included in the uniform resource locator of the resource 145 may specify a top level domain of the resource 145 including, for example, a country code top level domain (e.g., .us, .uk, .cn, .fr, and/or the like), a generic top level domain (e.g., .com, .org, .net, .biz, and/or the like), an infrastructure top level domain (e.g., .arpa), and/or the like. It should be appreciated that in order to implement a prefix-based and/or a suffix-based rule, the proxy auto-configuration file 200 may specify a length of the prefix and/or suffix (e.g., quantity of characters), case sensitivity, and the corresponding hash values.

As noted, a pattern-based rule applicable to the resource 145 may be identified based at least on a pattern present in the identifier associated with the resource 145. For example, a pattern-based rule applicable to the resource 145 may be identified based at least on the pattern present in a uniform resource locator (URL) of the resource 145. In some example embodiments, instead of an exact match to every portion of the uniform resource locator of the resource 145, the pattern-based rule may specify a pattern that includes one or more wildcard for at least some portions of the uniform resource locator. The pattern may also include one or more specific strings for some portions of the uniform resource locator.

A portion of a uniform resource locator may be defined by one or more delimiting characters present in the uniform resource locator including, for example, periods, hyphens, colons, semicolons, forward slashes, and/or the like. Delimiting characters may separate the uniform resource locator into a plurality of constituent components such as prefix, subdomain, domain name, suffix, port, and/or the like. To further illustrate, Table 1 below depicts an example of a pattern associated with a pattern-based rule that may be applicable to the resource 145. In the example shown in Table 1, the pattern-based rule may specify a pattern that includes a specific string for the domain name and suffix of a uniform resource locator but wildcard characters for the prefix and subdomain of the uniform resource locator. Accordingly, this pattern-based rule may be applicable to the resource 145 based on an exact match to the domain name included in the uniform resource locator of the resource 145 but not the prefix, subdomain, and the suffix.

TABLE 1

*.example.com

In some example embodiments, exposure of a rule may be avoided by including, in the proxy auto-configuration file 200, a first hash value to identify the resources associated with the rule instead of plaintext values. If the rule is a resource specific rule applicable to the resource 145, the first hash value may correspond to an identifier of the resource 145 including, for example, a uniform resource locator (URL) of the resource 145 or a host associated with the resource 145, which may be derived based on the uniform resource locator of the resource 145. Alternatively, if the rule is a pattern-based rule, then the first hash value may correspond to a pattern present in the uniform resource locator of the resource 145. For example, if the pattern-based rule is a prefix-based and/or a suffix-based rule, the first hash value may correspond to a prefix and/or a suffix present in the uniform resource locator of the resource 145. As noted, by including wildcard characters to represent at least some portions of the uniform resource locator instead of exact strings, the resource 145 may be mapped to the pattern-based rule without an exact match to these portions of the uniform resource locator associated with the resource 145 (e.g., prefix, subdomain, domain name, port, suffix, and/or the like).

The first hash value may be generated by applying, to a plaintext value identifying the resources associated with the rule, a hash function including, for example, SHA-1, SHA-2, SHA-256, and/or the like. Applying the hash function may obscure the plaintext value identifying the resources associated with the rule. Obscuring the plaintext value identifying the resources associated with the rule may render the plaintext value unintelligible to unauthorized third parties. As such, applying the hash function may prevent unauthorized third parties from determining the rule applicable to the resource 145 including, for example, whether requests to access the resource 145 are routed directly or through the proxy server 130. Moreover, as noted, the inclusion of the first hash value in the proxy auto-configuration file 200 may protect the enterprise's privacy and network security by at least preventing the unauthorized third parties from determining that the enterprise accesses the resource 145.

For example, for a resource-specific rule applicable to the resource 145, the first hash value may be generated by applying the hash function to the uniform resource locator (URL) of the resource 145. Alternatively, for a pattern-based rule applicable to the resource 145, the first hash value may be generated by applying the hash function to a pattern present in the uniform resource locator of the resource 145. For example, if the pattern-based rule is a prefix-based rule or a suffix based rule applicable to the resource 145, the first hash value may be generated by applying the hash function to the prefix and/or the suffix of the uniform resource locator associated with the resource 145 which, as noted, may include a first quantity of characters at a beginning of the uniform resource locator or a second quantity of characters at an end of the uniform resource locator.

In some example embodiments, the first hash value may be generated by applying the hash function to a salt in addition to the plaintext value identifying the resources associated with the rule. For example, the first hash value may be generated by applying the hash function to a concatenation of the salt and the plaintext value of the uniform resource locator of the resource 145 and/or the pattern present in the uniform resource locator of the resource 145. As used herein, the term salt may refer to random data that is used as additional input to the hash function. The addition of the salt may prevent the first hash value from being deciphered by a third party through a brute force attack such as a dictionary attack, a rainbow table attack, and/or the like.

Referring again FIG. 2, the proxy auto-configuration file 200 may include a function 250. The function 250 may be, for example, a JavaScript function and/or the like. In order to access the resource 145 at the resource server 140, the web browser 115 may invoke the function 250 by providing, to the function 250, an input that includes a plaintext value identifying the resource 145. The function 250 may respond by at least determining, based on the plaintext value identifying the resource 145, a second hash value. Moreover, the function 250 may match the second hash value to the first hash value included in the proxy auto-configuration file 200 and return a corresponding result to the web browser 115.

In some example embodiments, the first hash value may be mapped to a rule included in the proxy auto-configuration file 200 if the first hash value matches the hash value that is associated with the rule in the proxy auto-configuration file 200. For example, if the first hash value is mapped to a rule routing requests for the resource 145 through the proxy server 130, the result from the function 250 may include an Internet Protocol address and a port number of the proxy server 130 in order to instruct the web browser 115 to access the resource 145 through the proxy server 130. Alternatively, if the first hash value is mapped to a rule that allows the resource 145 to be accessed directly, the result from the function 250 may include an indication instructing the web browser 115 to bypass the proxy server 130 and access the resource 145 directly at the resource server 140.

To further illustrate, Table 2 below depicts an example of a proxy auto-configuration file including the function FindProxyForURL. The function FindProxyForURL may implement a resource-specific rule applicable to a resource with the uniform resource locator "citrix.sharefile.com." As shown in Table 2, instead of the plaintext value of the uniform resource locator "citrix.sharefile.com," the function FindProxyForURL may include a corresponding hash value to obscure the plaintext value of the uniform resource locator "citrix.sharefile.com." As such, a third party inspecting the proxy auto-configuration file cannot determine the rule applicable to the resource with the uniform resource locator "citrix.sharefile.com."

TABLE 2

```
function FindProxyForURL(url, host) {
    // Generate hash value of url
    var hash = sha256(url)
    // Requests with matched hash value are accessed
    // through proxy.example.com:
    if (shExpMatch(hash,
    "54ca223d7ae78c769730769629853a1eec32c113bdfa72d0c5979
```

TABLE 2-continued

```
7af13edee0c"))
    {
        return "PROXY 1.2.3.4:8080";
    }
    // All other requests bypass proxy.
    return "DIRECT";
}
```

In the example shown in Table 2, the function FindProxyForURL may receive an input that includes the plaintext value of a resource being accessed, for example, by the web browser 115. For example, the function FindProxyForURL may receive an input including a uniform resource locator (URL) of the resource being accessed by the web browser 115. In response, the function FindProxyForURL may generate a hash value by at least applying, to the input, a hash function including, for example, SHA-1, SHA-2, SHA-256, and/or the like. Furthermore, the function FindProxyForURL may compare the hash value to the hash value corresponding to the uniform resource locator "citrix.sharefile.com." The two hash values may match if the web browser 115 is accessing the resource "citrix.sharefile.com." If the two hash values match, the function FindProxyForURL may instruct the web browser 115 to access the resource at "citrix.sharefile.com" through a proxy server by returning an Internet Protocol address and a port number of the proxy server (e.g., "1.2.3.4:8080"). Alternatively, if the two hash values do not match, the function FindProxyForURL may return an indication (e.g., "DIRECT") instructing the web browser 115 to bypass the proxy server and access the resource at "citrix.sharefile.com" directly.

Table 3 below depicts another example of a proxy auto-configuration file including the function FindProxyForURL. In the example shown in Table 3, the function FindProxyForURL may implement a pattern-based rule, which may be a prefix-based and suffix-based rule applicable to one or more resources having the specified prefixes and suffixes.

TABLE 3

```
var hashArray = [
    {
        "hashSalt": "acb33edac3",
        "prefixLen": 7,
        "prefixHash":
"542ee2453a6ca6e63764ecc8453350fa2a083400126667a0b5968ad36795d
b814",
        "suffixLen": 9,
        "suffixHash":
"ffff865e4009cdfea425e112c6e1d58944f3b889fbef75837f740a75af3a
75f6"
    },
    {
        "hashSalt": "bcede34252",
        "prefixLen": 0,
        "prefixHash":
"65428536f177c099be401d17e8e227fd05e5b71430cd2dc11c613a2830ad
8f7d",
        "suffixLen": 8,
        "suffixHash":
"b4e1e1c9e0a281a0b2116c9fdab36cb4bb124d2021f5362a9e6e82f3dcdc
bda7"
    },
    {
        "hashSalt": "dfaef34523",
        "prefixLen": 7,
        "prefixHash":
"43ead40acf1f4e339e0266b6ab5ac86bce4e7262091adc7dbcaf35cc9816
c43e",
        "suffixLen": 0,
        "suffixHash":
```

TABLE 3-continued

```
"ef7dc0aa7e39e63bb3180848dbe9306b7c5dec132df86f024a517cb727a3
5549"
  }
];
function calculateSaltedHash(str, salt) {
    return SHA256(SHA256(str)+salt);
}
function FindProxyForURL(url, host) }
    var lowerHost = host.toLowerCase ( );
    var lengthHost = lowerHost.length;
    for (var i = 0; i < hashArray.length; i ++) }
        var prefix = lowerHost.substring(0,
hashArray[i].prefixLen);
        var suffix = lowerHost.substring(lengthHost −
hashArray[i].suffixLen);
        if (calculateSaltedHash(prefix,
hashArray[i].hashSalt) == hashArray[i].prefixHash &&
            calculateSaltedHash(suffix,
hashArray[i].hashSalt) == hashArray[i].suffixHash) }
                return "PROXY 192.168.0.1:8080";
        }
    }
    // Consult other additional rules
    return "DIRECT";
}
```

The example of the proxy auto-configuration file shown in Table 3 may implement three rules, each of which being mapped to resources having a certain prefix and suffix. Accordingly, the proxy auto-configuration file may include a hash array specifying the length of the prefixes and suffixes associated with each of the rules implemented by the proxy auto-configuration file. For example, the first of the three rules may be applicable to resources whose uniform resource locator (URL) has a seven-character long prefix and a hash value of "542ee2453a6ca6e63764ecc8453350fa2a08340012667 a0b5968ad36795db814." The first rule may be further applicable to resources whose uniform resource locator has a nine-character long suffix and a hash value of "ffff865e4009cdfea425e112c6e1d58944f3b889fbef75837 f740a75af3a75f6." In the example of the proxy auto-configuration file shown in Table 3, requests for resources that are mapped to this rule may be routed through port 8080 of the proxy server at the internet protocol address 192.168.0.1.

Referring again to Table 3, the rules implemented by the proxy auto-configuration file may be associated with a salt. For example, the first rule may be associated with a salt having the value "acb33edac3." Accordingly, the hash value of the seven-character long prefix associated with the first rule may be determined by at least applying the hash function calculateSaltedHash to a concatenation of the seven-character long prefix and the salt "acb33edac3" while the hash value of the nine-character long suffix associated with the first rule may be generated by applying the hash function calculateSaltedHash to a concatenation of the nine-character long suffix and the salt "acb33edac3."

In the example shown in Table 3, the function FindProxyForURL may receive an input that includes the plaintext value of a resource being accessed by the web browser 115 including, for example, a uniform resource locator (URL) associated with the resource. In response, the function FindProxyForURL may determine whether the uniform resource locator of the resource is mapped to any of the rules included in the proxy auto-configuration file including by generating a first hash value for a prefix of the uniform resource locator of the resource and a second hash value for a suffix of the uniform resource locator of the resource. For example, to determine whether the resource being accessed by the web browser 115 is mapped to the first rule, the first hash value may be generated by at least applying the hash function calculateSaltedHash to the salt "acb33edac3" and the seven characters at a beginning of the string corresponding to the uniform resource locator of the resource. Furthermore, the second hash value may be generated by at least applying the hash function calculateSaltedHash to the salt "acb33edac3" and the nine characters at an end of the string corresponding to the uniform resource locator of the resource. The first rule may be applicable to the resource if the first hash value equals "542ee2453a6ca6e63764ecc8453350fa2a08340012667 a0b5968ad36795db814" and the second hash value equals "ffff865e4009cdfea425e112c6e1d58944f3b889fbef7583 7f740a75af3a75f6."

Figure 3A:
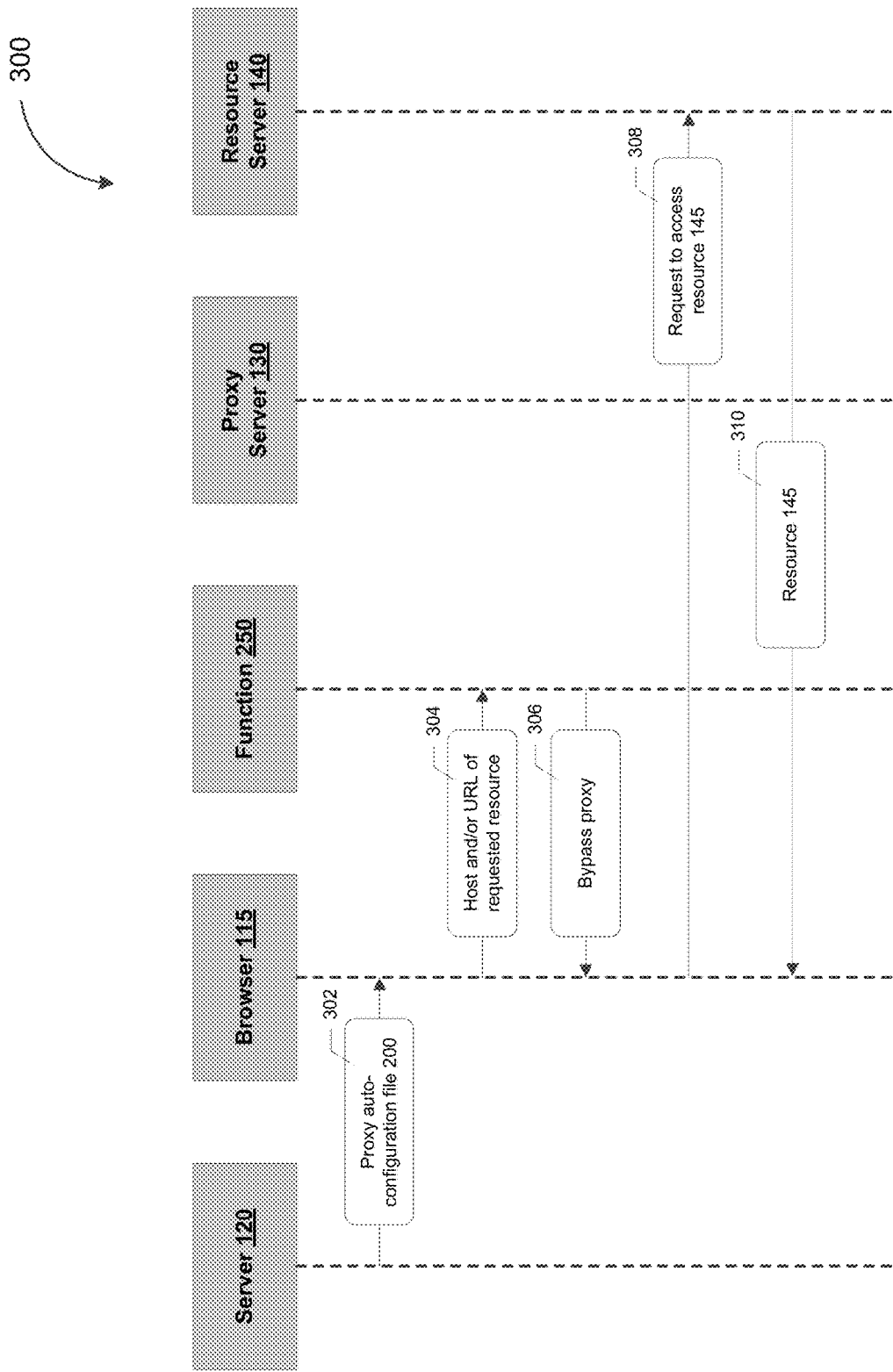
FIG. 3A depicts a sequence diagram illustrating an example of a process for accessing a resource through a proxy server, in accordance with some example embodiments.

FIG. 3A depicts a sequence diagram illustrating an example of a process 300 for accessing a resource directly while bypassing a proxy server, in accordance with some example embodiments. Referring to FIGS. 1-2 and 3A, the process 300 may be performed by the first client 110a in order to access the resource 145 at the resource server 140.

At 302, the web browser 115 at the first client 110a may retrieve, from the server 120, the proxy auto-configuration file 200. The proxy auto-configuration file 200 may be published to the server 120 and/or generated at the server 120 in response to the web browser 115 accessing the server 120 to retrieve the proxy auto-configuration file 200. As shown in FIG. 2, the proxy auto-configuration file 200 may include the function 250. In order to determine whether the resource 145 may be accessed directly or through a proxy server, the web browser 115 may invoke the function 250 at 304. The web browser 115 may invoke the function 250 by at least providing, to the function 250, an input that includes a plaintext value identifying the resource 145. For example, as shown in FIG. 3A, the input to the function 250 may include a uniform resource locator (URL) of the resource 145 and/or a host of the resource 145.

In some example embodiments, the function 250 may implement a resource-specific rule and/or a pattern-based rule controlling whether the resource 145 is accessed directly or through a proxy server. Accordingly, the function 250 may respond to the input from the web browser 115 by at least generating a hash value corresponding to the uniform resource locator (URL) of the resource 145. For example, the function 250 may generate the hash value by at least applying a hash function to the uniform resource locator of the resource 145 and/or a pattern present in the uniform resource locator of the resource 145.

The function 250 may map the hash value to a corresponding rule, which may allow the resource 145 to be accessed directly. Accordingly, at 306, the function 250 may return, to the web browser 115, an indication to access the resource 145 directly, and thus bypass the proxy server 130. The web browser 115 may therefore communicate directly with the resource server 140 without the proxy server 130 serving as an intermediary. As shown in FIG. 3A, at 308, in response to receiving the indication from the function 250, the web browser 115 may access the resource 145 directly by at least sending, to the resource server 140, a request for the resource 145. Furthermore, at 310, the web browser 115 may receive, from the resource server 140, the resource 145.

Figure 3B:
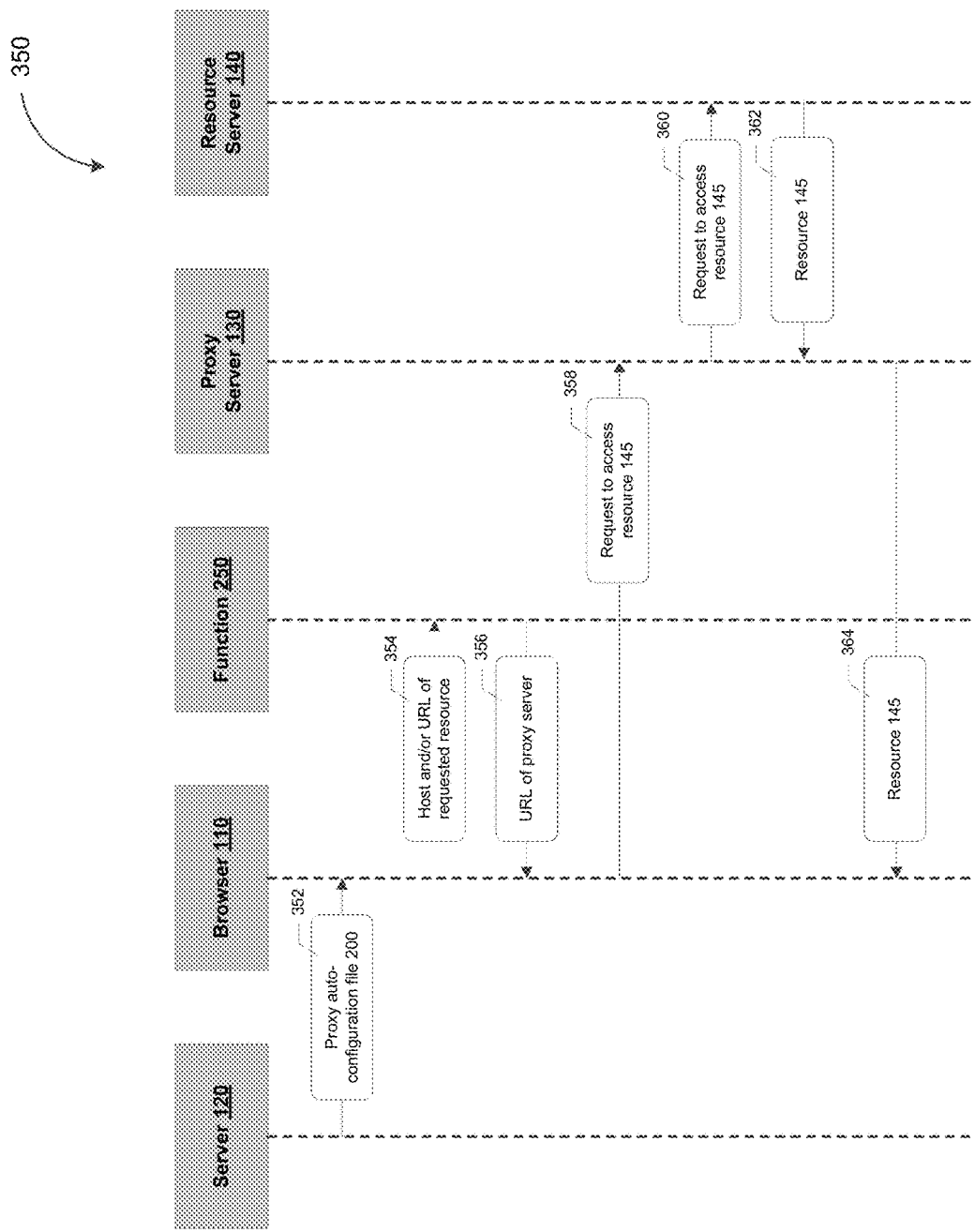
FIG. 3B depicts a sequence diagram illustrating an example of a process for accessing a resource directly while bypassing a proxy server, in accordance with some example embodiments.

FIG. 3B depicts a sequence diagram illustrating an example of a process 350 for accessing a resource through a proxy server, in accordance with some example embodiments. At 352, the web browser 115 at the first client 110a, may retrieve, from the server 120, the proxy auto-configuration file 200, which may include the function 250. At 354, the web browser 115 may determine whether the resource 145 may be accessed directly or through a proxy server by at least invoking the function 250. The web browser 115 may invoke the function 250 by at least providing, to the function 250, an input that includes a plaintext value identifying the resource 145. For example, the input to the function 250 may include a uniform resource locator (URL) of the resource 145 and a host of the resource 145.

In some example embodiments, the function 250 may implement a resource-specific rule and/or a pattern-based rule to determine whether the resource 145 is accessed directly or through a proxy server. Accordingly, the function 250 may respond to the input from the web browser 115 by at least generating a hash value corresponding to the uniform resource locator of the resource 145. For example, the function 250 may generate the hash value by at least applying a hash function to the uniform resource locator of the resource 145 and/or a pattern present in the uniform resource locator of the resource 145.

The function 250 may map the hash value to a corresponding rule that routes requests for the resource 145 through the proxy server 130. Accordingly, at 356, the function 250 may instruct the web browser 115 to access the resource 145 through the proxy server 130 by at least returning, to the web browser 115, an Internet Protocol (IP) address and a port number of the proxy server 130. At 358, in response to receiving the indication from the function 250, the web browser 115 may access the resource 145 through the proxy server 130 by at least sending, to the proxy server 130, a request for the resource 145.

The proxy server 130 may, as noted, serve as an intermediary between the first client 110a and the resource server 140. The proxy server 130 may perform a variety of tasks including, for example, inspecting content flowing through the proxy server 130, filtering the content, caching the content to expedite subsequent requests for the same content, anonymizing the requests to access the content, repairing errors in the content, translating the content into a different language, and/or the like. Accordingly, at 360, the proxy server 130 may forward, to the resource server 140, the request from the first client 110a to access the resource 145. Moreover, at 362, the proxy server 130 may receive, from the resource server 140, the resource 145. In the example shown in FIG. 3B, the proxy server 130 may, at 364, forward the resource 145 to the web browser 115 at the first client 110a. However, it should be appreciated that the proxy server 130 may also deny the request to access the resource 145 altogether or intercept at least a portion of the resource 145 before forwarding the resource 145 to the web browser 115 at the first client 110a.

Figure 4A:
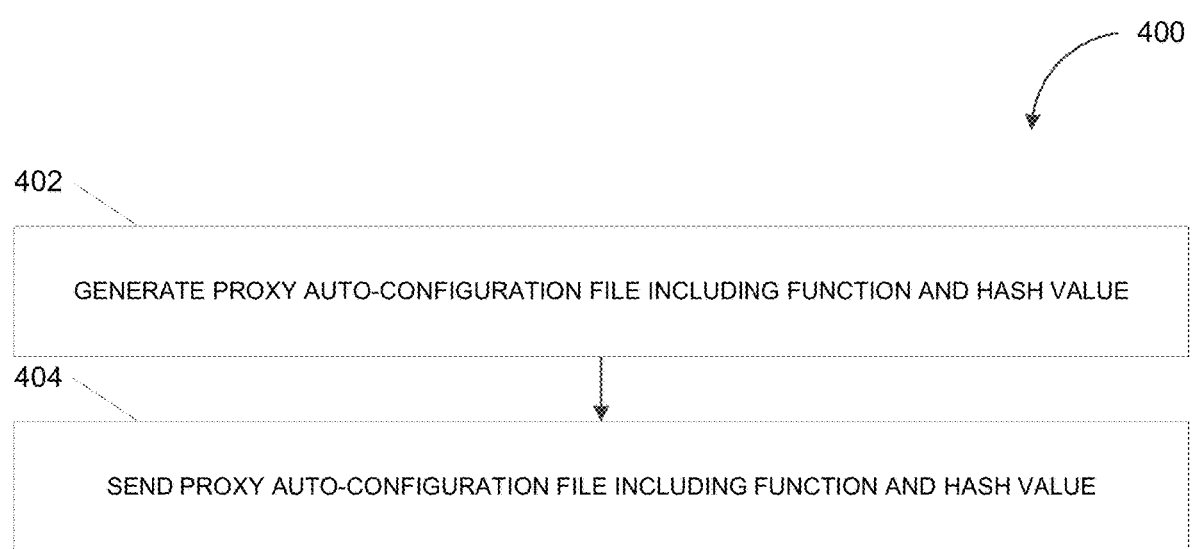
FIG. 4A depicts a flowchart illustrating an example of a process for generating a proxy auto-configuration file, in accordance with some example embodiments.

FIG. 4A depicts a flowchart illustrating an example of a process 400 for generating a proxy auto-configuration file, in accordance with some example embodiments. Referring to FIGS. 1-2 and 4A, the process 400 may be performed at the second client 110b to generate, for example, the proxy auto-configuration file 200.

At 402, the second client 110b may generate a proxy auto-configuration file including a function and a hash value. For example, the second client 110b may generate the proxy auto-configuration file 200 to implement one or more rules controlling access to the resource 145 at the resource server 140. The proxy auto-configuration file 200 may include the function 250. Furthermore, instead of a plaintext value identifying the resource 145, the proxy auto-configuration file may include a hash value identifying the resource 145. The hash value included in the proxy auto-configuration file 200 may be determined based at least on an identifier of the resource 145, which may be a uniform resource locator (URL) of the resource 145. Alternatively and/or additionally, the hash value included in the proxy auto-configuration file 200 may be determined based on a pattern present in the uniform resource locator of the resource 145. For example, the hash value included in the proxy auto-configuration file 200 may be determined based on one or more portions of the uniform resource locator (URL) of the resource 145 (e.g., prefix, subdomain, domain name, suffix, port, and/or the like). As noted, unlike a plaintext value, the hash value may be unintelligible to unauthorized third parties. Accordingly, including the hash value in the proxy auto-configuration file 200 may prevent unauthorized third parties inspecting the proxy auto-configuration file 200 from determining the rule applicable to the resource 145.

At 404, the second client 110b may send the proxy auto-configuration file including the function and the hash value. For example, the second client 110b may send the proxy auto-configuration file 200 to the first client 110a by at least publishing the proxy auto-configuration file 200 to the server 120. Alternatively, the server 120 may generate the proxy auto-configuration file 200 on demand, for example, in response to the web browser 115 accessing the server 120 to retrieve the proxy auto-configuration file 200. The proxy auto-configuration file 200 may be sent to the first client 110a to at least enable the function to be invoked by the web browser 115 at the first client 110a to determine, based on the hash value included in the proxy auto-configuration file 200, whether to bypass the proxy server 130 when accessing the resource 145 at the resource server 140.

In some example embodiments, the web browser 115 at the first client 110a may retrieve, based at least on a uniform resource locator (URL) of the server 120, the proxy auto-configuration file 200 from the server 120. As noted, the uniform resource locator of the server 120 may be configured at the web browser 115 manually. Alternatively, the web browser 115 may automatically determine the uniform resource locator of the server 120 by at least executing, for example, a web proxy auto-discovery (WPAD) protocol and/or the like. Upon retrieving the proxy auto-configuration file 200, the web browser 115 at the first client 110 may invoke the function 250 and determine, based at least on an output of the function 250, whether to access the resource 145 directly or through the proxy server 130.

Figure 4B:
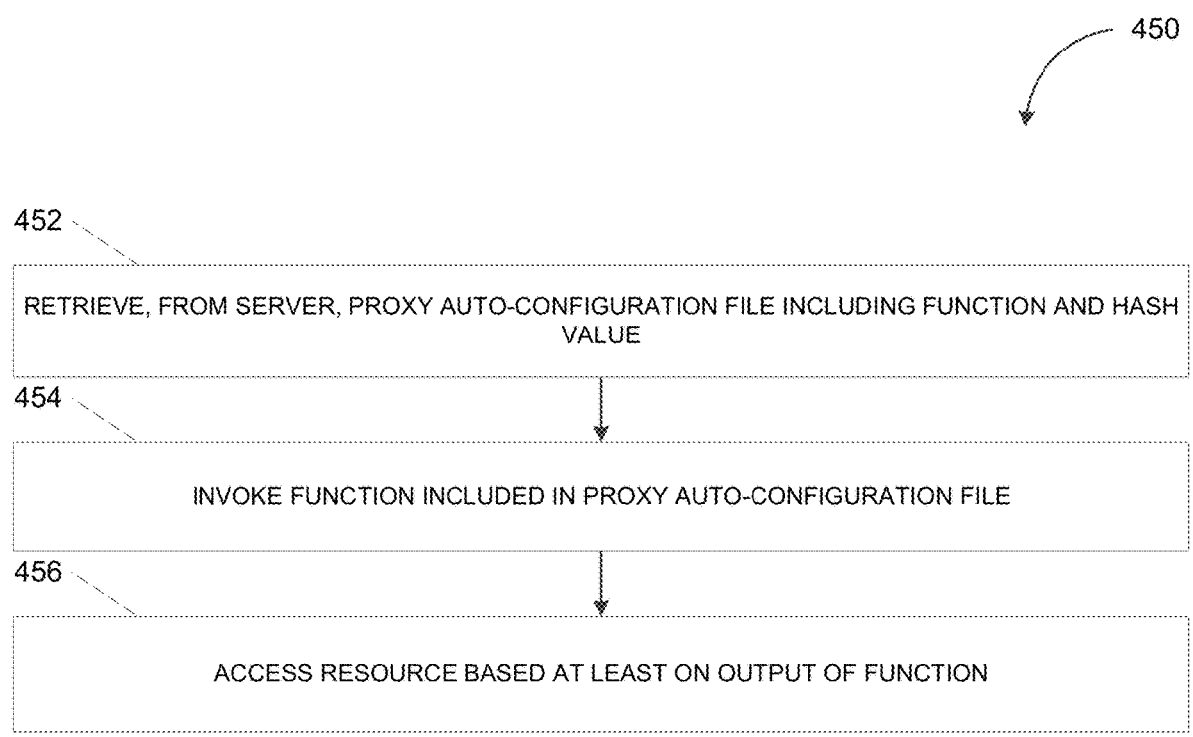
FIG. 4B depicts a flowchart illustrating an example of a process for accessing a resource, in accordance with some example embodiments.

FIG. 4B depicts a flowchart illustrating an example of a process 450 for accessing a resource, in accordance with some example embodiments. Referring to FIGS. 1-2 and 4B, the process 450 may be performed by the first client 110a in order to access, for example, the resource 145 at the resource server 140.

At 452, the first client 110a may retrieve, from a server, a proxy auto-configuration file that includes a function and a hash value. In some example embodiments, the first client 110a may retrieve, based at least on a uniform resource locator (URL) of the server 120, the proxy auto-configuration file 200. The proxy auto-configuration file 200 may, as noted, implement one or more rules including, for example, a rule controlling whether the resource 145 at the resource server 140 is accessed directly or through the proxy server 130. Accordingly, the proxy auto-configuration file 200 may include a first hash value identifying the resource 145 as being associated with the one or more rules. The proxy auto-configuration file 200 may include the first hash value identifying the resource 145 instead of a plaintext value identifying the resource 145. Moreover, the proxy auto-configuration file 200 may include the function 250 configured to generate an output indicating whether the resource 145 is accessed directly or through the proxy server 130.

At 454, the first client 110*a* may invoke the function included in the proxy auto-configuration file. For example, in order to access the resource 145 at the resource server 140, the web browser 115 at the first client 110*a* may invoked the function 250 by providing, to the function 250, an input including a plaintext value identifying the resource 145. The plaintext value identifying the resource 145 may include a uniform resource locator (URL) of the resource 145 and/or a host of the resource 145, which may be derived based on the uniform resource locator of the resource 145. The function 250 may respond by at least determining, based on the plaintext value identifying the resource 145, a second hash value. Moreover, the function 250 may match the second hash value to the first hash value included in the proxy auto-configuration file 200 to identify an applicable rule. The function 250 may return, to the web browser 115, a result of applying the rule applicable to the resource 145.

At 456, the first client 110*a* may access the resource based at least on an output of the function. The function 250 may, as noted, match the second hash value to the first hash value included in the proxy auto-configuration file 200 in order to identify a rule applicable to the resource 145. For instance, if the first hash value is mapped to a rule routing requests for the resource 145 through the proxy server 130, the function 250 may output an Internet Protocol address and a port number of the proxy server 130 in order to instruct the web browser 115 to access the resource 145 through the proxy server 130. Accordingly, the web browser 115 may access the resource 145 through the proxy server 130 by at least sending, to the proxy server 130, a request to access the resource 145. The proxy server 130 may therefore serve as an intermediary between the first client 110*a* and the resource server 140. For example, if the proxy server 130 does not deny the request to access the resource 145, the proxy server 130 may forward the request from the web browser 115 to the resource server 140. Moreover, the proxy server 130 may receive the resource 145 from the resource server 140 and forward, to the first client 110*a*, at least a portion of the resource 145.

Alternatively, if the first hash value is mapped to a rule that allows the resource 145 to be accessed directly, the function 250 may output an indication instructing the web browser 115 to bypass the proxy server 130 and access the resource 145 directly at the resource server 140. Accordingly, the web browser 115 may send, to the resource server 140, a request to access the resource 145. Moreover, the web browser 115 may receive, from the resource server 140, the resource 145.

Figure 5A:
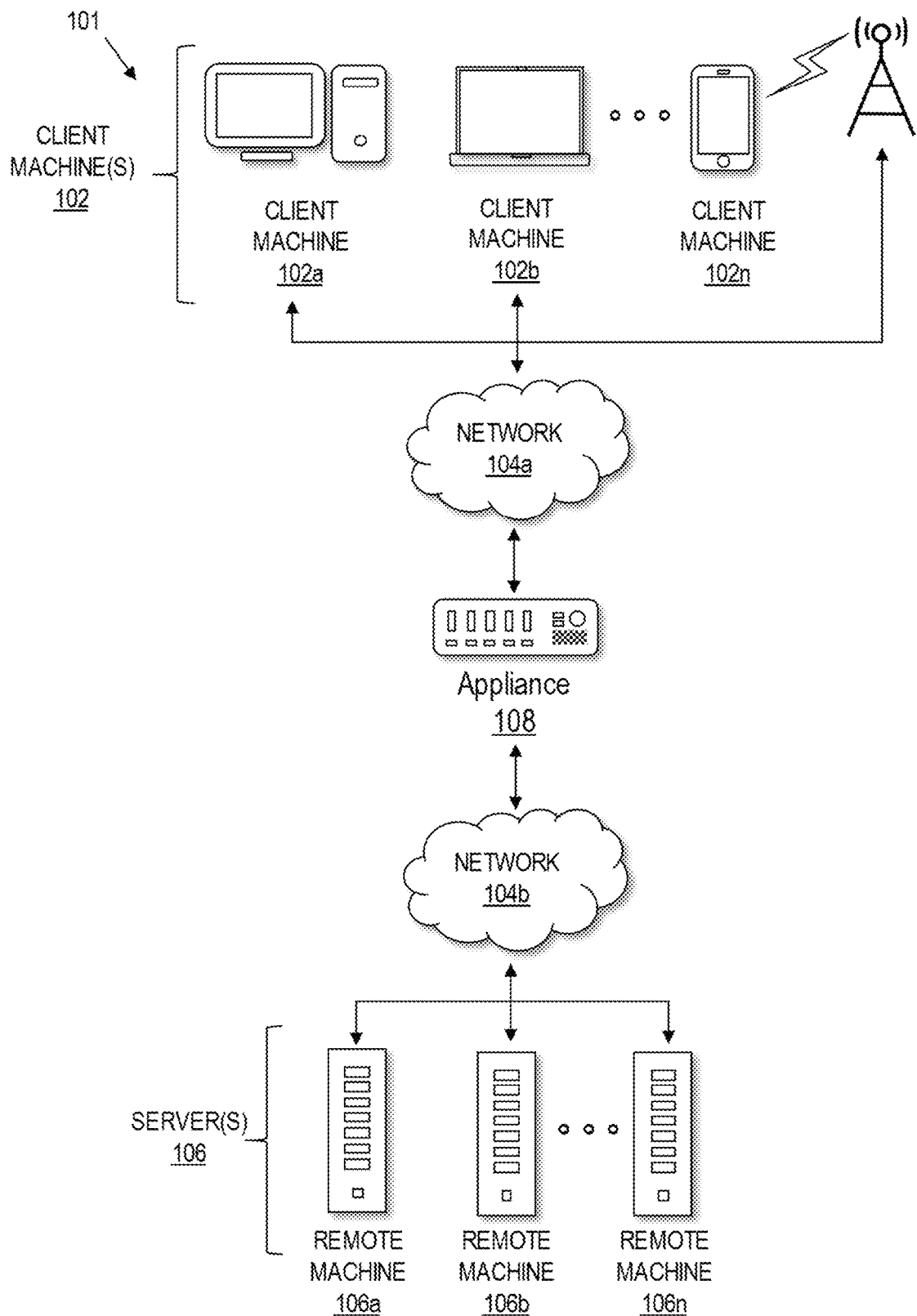
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1 and 5A, the network environment 101 in which various aspects of the disclosure may be implemented may include one or more clients 102*a*-102*n*, one or more remote machines 106*a*-106*n*, one or more networks 104*a* and 104*b*, and one or more appliances 108 installed within the network environment 101. The clients 102*a*-102*n* communicate with the remote machines 106*a*-106*n* via the networks 104*a* and 104*b*.

In some example embodiments, the clients 102*a*-102*n* may communicate with the remote machines 106*a*-106*n* via an appliance 108. The illustrated appliance 108 is positioned between the networks 104*a* and 104*b*, and may also be referred to as a network interface or gateway. In some example embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104*a* and/or 104*b*.

The clients 102*a*-102*n* may be generally referred to as client machines, local machines, clients, client nodes, client computers, client devices, computing devices, endpoints, or endpoint nodes. The clients 102*a*-102*n* may include, for example, the first client 110*a*, the second client 110*b*, and/or the like. The remote machines 106*a*-106*n* may be generally referred to as servers or a server farm. In some example embodiments, a client 102 may have the capacity to function as both a client node seeking access to resources provided by a server 106 and as a server 106 providing access to hosted resources for other clients 102*a*-102*n*. The networks 104*a* and 104*b* may be generally referred to as a network 104. The network 104 including the networks 104*a* and 104*b* may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 may include, for example, the server 120, the proxy server 130, the resource server 140, and/or the like.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client 102.

In yet other example embodiments, a server 106 may execute a virtual machine providing, to a user of a client 102, access to a computing environment. The client 102 may be a virtual machine. The virtual machine may be managed by, for example, a hypervisor, a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
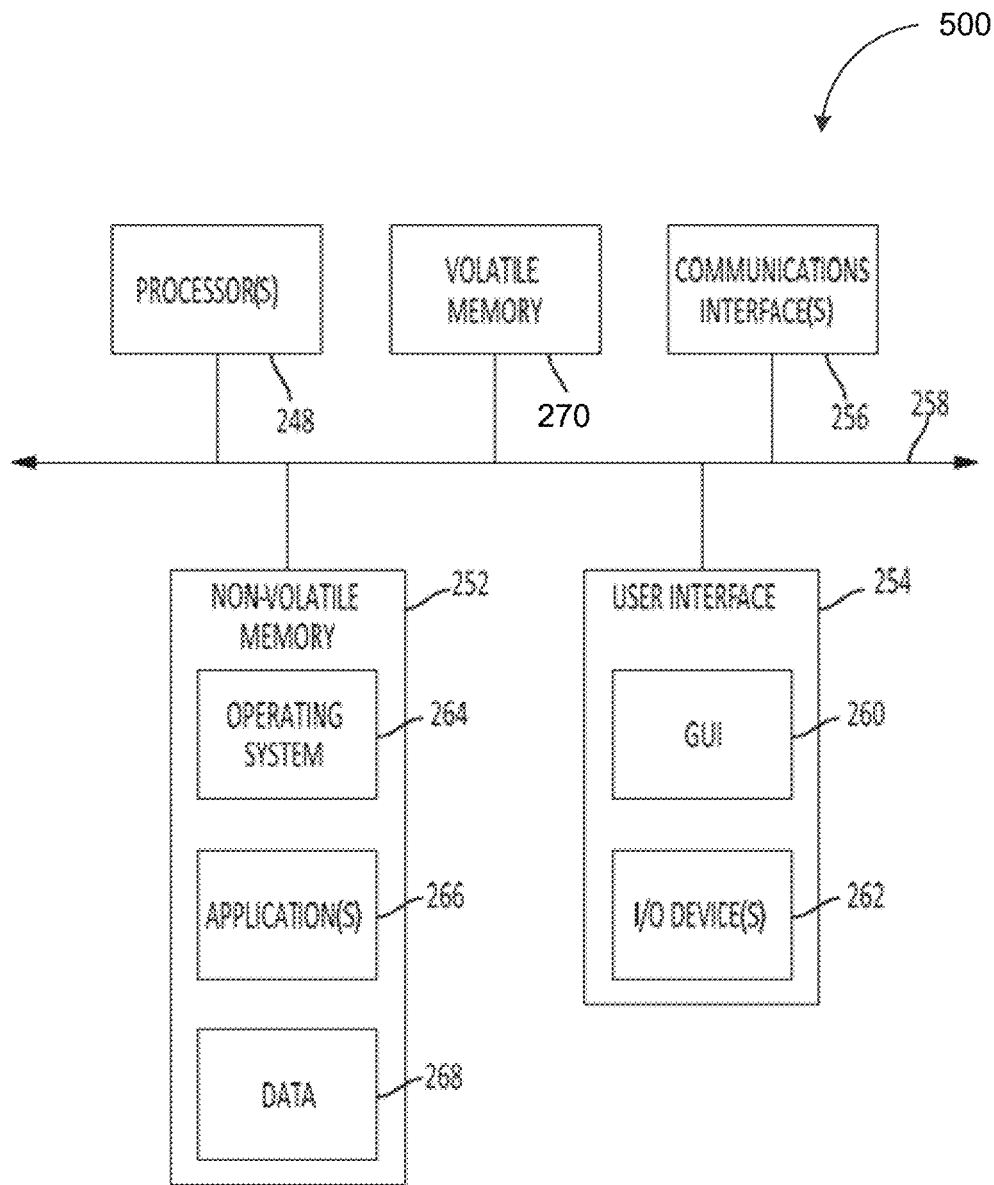
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1 and 5A-B, the computing device 500 may be useful for practicing an embodiment of the clients 102, the servers 106, and/or the appliances 108.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The nonvolatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the bus 258. The computing device 500 as shown in FIG. 5B is shown merely as an example, as the clients 102, the servers 106, and the appliances 108 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 102), may execute a virtual machine, which provides an execution session within which applications execute on behalf of a user or a client computing device (e.g., the clients 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 5C:
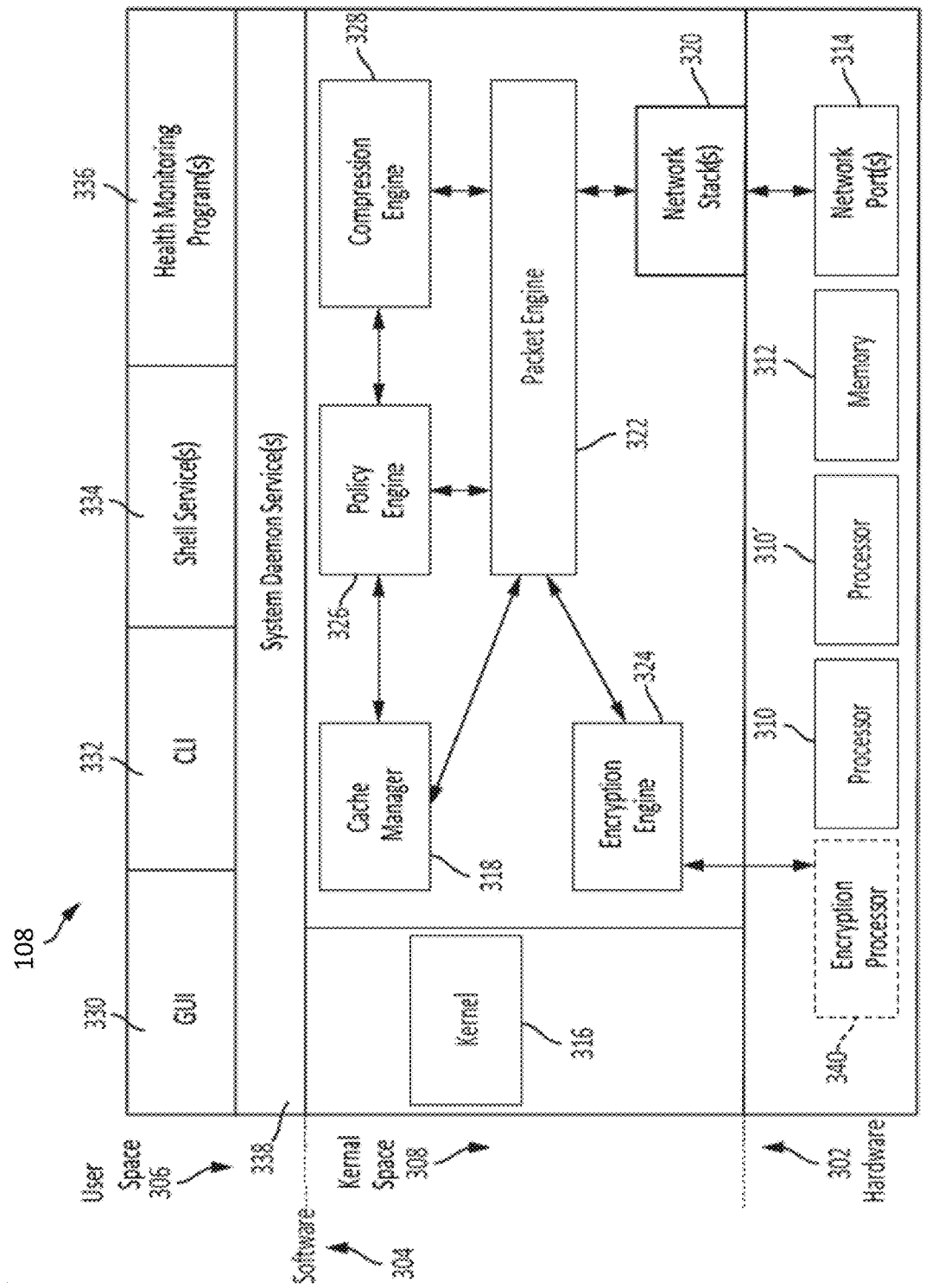
FIG. 5C depicts a block diagram illustrating an example of a network appliance, in accordance with some example embodiments.

FIG. 5C depicts a block diagram illustrating an example of the network appliance 108, in accordance with some example embodiments. The appliance 108 may be implemented as a server, gateway, router, switch, bridge or other type of computing or network device. As shown in FIG. 5C, in some example embodiments, the appliance 108 may include a hardware layer 302 and a software layer 304 divided into a user space 306 and a kernel space 308. The hardware layer 302 may provide the hardware elements upon which programs and services within the kernel space 308 and the user space 306 are executed, and may also allow programs and services within the kernel space 308 and the user space 306 to communicate data both internally and externally with respect to the appliance 108. As shown, the hardware layer 302 may include one or more processing units 310 for executing software programs and services, memory 312 for storing software and data, one or more network ports 314 for transmitting and receiving data over one or more networks 104, and an encryption processor 340 for encrypting and decrypting data such as in relation to Secure Socket Layer (SSL) or Transport Layer Security (TLS) processing of data transmitted and received over one or more networks 104.

An operating system (not shown in FIG. 5C) of the appliance 108 allocates, manages, or otherwise segregates the available system memory into the kernel space 308 and the user space 306. The kernel space 308 may be reserved for running a kernel 316, including any device drivers, kernel extensions or other kernel related software. As known to those skilled in the art, the kernel 316 is the core of the operating system, and provides access, control, and management of resources and hardware-related elements of the appliance 108. The kernel space 308 may also include a number of network services or processes working in conjunction with a cache manager 318.

The appliance 108 may include one or more network stacks 320, such as a TCP/IP based stack, for communicating with the client(s) 102, server(s) 106, network(s) 104a and 104b, and/or other appliances 108. For example, the appliance 108 may establish and/or terminate one or more transport layer connections between the client(s) 102 and the server(s) 106. Each network stack 320 may include a buffer for queuing one or more network packets for transmission by the appliance 108.

The kernel space 308 may include the cache manager 318, a packet engine 322, an encryption engine 324, a policy engine 326, and a compression engine 328. One or more of the processes 318, 322, 324, 326 and 328 may thus run in the core address space of the operating system of the appliance 108, which may reduce the number of data transactions to and from the memory and/or context switches between kernel mode and user mode, for example since data obtained in kernel mode may not need to be passed or copied to a user process, thread or user level data structure.

The cache manager 318 may duplicate original data stored elsewhere or data previously computed, generated or transmitted to reducing the access time of the data. In some example embodiments, the cache memory may be a data object in the memory 312 of the appliance 108, or may be a physical memory having a faster access time than memory the 312.

The policy engine 326 may include a statistical engine or other configuration mechanism to allow a user to identify, specify, define, or configure a caching policy and access, control and management of objects, data or content being cached by the appliance 108, and define or configure security, network traffic, network access, compression or other functions performed by the appliance 108.

The encryption engine 324 may process any security related protocol, such as SSL or TLS. For example, the encryption engine 324 may encrypt and decrypt network packets, or any portion thereof, communicated via the appliance 108, may setup or establish SSL, TLS or other secure connections, for example, between the client(s) 102, the server(s) 106, and/or one or more other appliances 108. In some example embodiments, the encryption engine 324 may use a tunneling protocol to provide a virtual private network (VPN) between a client 102 and a server 106. For example, in some example embodiments, the encryption engine 324 may be in communication with the encryption processor 340. The compression engine 328 may compress network packets bi-directionally between the client(s) 102 and the server(s) 106 and/or between one or more of the appliances 108.

The packet engine 322 may manage kernel-level processing of packets received and transmitted by the appliance 108 via the network stack(s) 320 to send and receive network packets via the network port(s) 314. The packet engine 322 may, for example, operate in conjunction with the encryption engine 324, the cache manager 318, the policy engine 326, and/or the compression engine 328 to perform encryption/decryption, traffic management such as request-level content switching and request-level cache redirection, and/or compression and decompression of data.

The user space 306 may be a memory area or portion of the operating system used by user mode applications or programs otherwise running in user mode. A user mode application may, for example, not access the kernel 316 directly and may instead use service calls in order to access kernel services. As shown in FIG. 5C, the user space 306 may, for example, include a graphical user interface (GUI) 330, a command line interface (CLI) 332, one or more shell services 334, one or more health monitoring programs 336, and/or one or more daemon services 338. The GUI 330 and/or the CLI 332 may enable a system administrator or other user to interact with and control the operation of the appliance 108, such as via the operating system of the appliance 108. The shell service(s) 334 may, for example, include programs, services, tasks, processes, and/or executable instructions to support interaction with the appliance 108 by a user via the GUI 330 and/or the CLI 332.

The health monitoring program(s) 336 may monitor, check, report and/or ensure that network systems are functioning properly and that users are receiving requested content over a network, for example, by monitoring activity of the appliance 108. In some example embodiments, the health monitoring program(s) 336 may intercept and inspect any network traffic passed via the appliance 108. For example, the health monitor program 336 may interface with one or more of the encryption engine 324, the cache manager 318, the policy engine 326, the compression engine 328, the packet engine 322, the daemon service(s) 338, and the shell service(s) 334 to determine a state, status, operating condition, and/or health of any portion of the appliance 108. Further, the health monitoring program(s) 336 may determine if a program, process, service and/or task is active and currently running, check status, error, and/or history logs provided by any program, process, service and/or task to determine any condition, status and/or error with any portion of the appliance 108. Additionally, the health monitoring program(s) 336 may measure and monitor the performance of any application, program, process, service, task, and/or thread executing on the appliance 108.

The daemon service(s) 338 are programs that run continuously or in the background and handle periodic service requests received by the appliance 108. In some example embodiments, a daemon service 338 may, for example, forward such requests to other programs and/or processes, such as another daemon service 338, as appropriate.

The appliance 108 may relieve the server(s) 106 of much of the processing load caused by repeatedly opening and closing transport layer connections to the client(s) 102 by opening one or more transport layer connections with each server 106 and maintaining these connections to allow repeated data accesses by the client(s) 102 via the Internet (e.g., "connection pooling"). To perform connection pooling, the appliance 108 may translate or multiplex communications by modifying sequence numbers and acknowledgment numbers at the transport layer protocol level (e.g., "connection multiplexing"). The appliance 108 may also provide switching and/or load balancing for communications between the client(s) 102 and the server(s) 106.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
    at least one data processor; and
    at least one memory storing instructions which, when executed by the at least one data processor, cause the at least one data processor to at least:
    generate a proxy auto-configuration file including a function and a first hash value associated with a resource, the first hash value determined based at least on an identifier of the resource, and the proxy auto-configuration file including the first hash value instead of a plaintext value of the identifier to at least obscure the plaintext value of the identifier; and
    send the proxy auto-configuration file including the function and the first hash value to at least enable the function to be invoked by a web browser at one or more clients, the function configured to respond to being invoked by the web browser by at least determining, based at least on the first hash value, whether to bypass a proxy server when accessing the resource.

2. The system of claim 1, wherein in response to being invoked by the web browser, the function is configured to determine a second hash value based on a plaintext input received from the web browser, and wherein the plaintext input identifies a resource being accessed by the web browser.

3. The system of claim 2, wherein the function is further configured to output, based at least on the second hash value matching the first hash value, a first indication to access the resource through the proxy server or a second indication to bypass the proxy server when accessing the resource.

4. The system of claim 3, wherein the first indication includes an Internet Protocol address and a port number of the proxy server through which to access the resource.

5. The system of claim 1, wherein the identifier includes a uniform resource locator and/or a host identifier of the resource.

6. The system of claim 5, wherein the first hash value is determined based on a pattern present in the uniform resource locator of the resource.

7. The system of claim 6, wherein the pattern includes a wildcard value for a portion of the uniform resource locator, and wherein the pattern includes the wildcard value instead of an actual value of the portion of the uniform resource locator.

8. The system of claim 7, wherein the portion of the uniform resource locator comprises a prefix, a subdomain, a domain name, a suffix, or a port.

9. The system of claim 1, wherein the proxy auto-configuration file is published to a server for retrieval by the web browser, or generated and sent to the web browser in response to the web browser retrieving the proxy auto-configuration file.

10. The system of claim 1, wherein the first hash value is determined based on a concatenation of the identifier and a salt.

11. A computer-implemented method, comprising:
    generating a proxy auto-configuration file including a function and a first hash value associated with a resource, the first hash value determined based at least on an identifier of the resource, and the proxy auto-configuration file including the first hash value instead of a plaintext value of the identifier to at least obscure the plaintext value of the identifier; and
    sending the proxy auto-configuration file including the function and the first hash value to at least enable the function to be invoked by a web browser at one or more clients, the function configured to respond to being invoked by the web browser by at least determining, based at least on the first hash value, whether to bypass a proxy server when accessing the resource.

12. The method of claim 11, wherein in response to being invoked by the web browser, the function is configured to determine a second hash value based on a plaintext input received from the web browser, and wherein the plaintext input identifies a resource being accessed by the web browser.

13. The method of claim 12, wherein the function is further configured to output, based at least on the second hash value matching the first hash value, a first indication to access the resource through the proxy server or a second indication to bypass the proxy server when accessing the resource.

14. The method of claim 13, wherein the first indication includes an Internet Protocol address and a port number of the proxy server through which to access the resource.

15. The method of claim 11, wherein the identifier includes a uniform resource locator and/or a host identifier of the resource.

16. The method of claim 15, wherein the first hash value is determined based on a pattern present in the uniform resource locator of the resource.

17. The method of claim 16, wherein the pattern includes a wildcard value for a portion of the uniform resource locator, and wherein the pattern includes the wildcard value instead of an actual value of the portion of the uniform resource locator.

18. The method of claim 17, wherein the portion of the uniform resource locator comprises a prefix, a subdomain, a domain name, a suffix, or a port.

19. The method of claim 11, wherein the first hash value is determined based on a concatenation of the identifier and a salt.

20. A non-transitory computer-readable medium storing instructions, which when executed by at least one data processor, cause the at least one data processor to at least:
generate a proxy auto-configuration file including a function and a first hash value associated with a resource, the first hash value determined based at least on an identifier of the resource, and the proxy auto-configuration file including the first hash value instead of a plaintext value of the identifier to at least obscure the plaintext value of the identifier; and
send the proxy auto-configuration file including the function and the first hash value to at least enable the function to be invoked by a web browser at one or more clients, the function configured to respond to being invoked by the web browser by at least determining, based at least on the first hash value, whether to bypass a proxy server when accessing the resource.

\* \* \* \* \*